US007559480B2

(12) United States Patent
Wu

(10) Patent No.: US 7,559,480 B2

(45) Date of Patent: Jul. 14, 2009

(54) METHOD AND DEVICE FOR PRINTING VALUE-ADDED INFORMATION

(75) Inventor: Yung-Chuan Wu, Pingjhen (TW)

(73) Assignee: Avision Inc. (TW)

( * ) Notice: Subject to any disclaimer, the term of this patent is extended or adjusted under 35 U.S.C. 154(b) by 627 days.

(21) Appl. No.: 11/190,845

(22) Filed: Jul. 28, 2005

(65) Prior Publication Data

US 2006/0032903 A1 Feb. 16, 2006

(30) Foreign Application Priority Data

Aug. 16, 2004 (TW) .............................. 93124585 A

(51) Int. Cl.
*G06K 19/00* (2006.01)
*G03G 15/00* (2006.01)

(52) U.S. Cl. ........................................ 235/487; 399/19

(58) Field of Classification Search ................. 235/487; 399/19, 21, 384; 347/42; 358/1.15
See application file for complete search history.

(56) References Cited

U.S. PATENT DOCUMENTS 6,567,621 B2 * 5/2003 Miyoshi et al. ............... 399/19
2004/0247365 A1 * 12/2004 Lofthus et al. .............. 400/582
2005/0254090 A1 * 11/2005 Kammerlocher et al. ... 358/1.18

* cited by examiner

*Primary Examiner*—Daniel A Hess

(57) ABSTRACT

A method and a device are provided for printing value-added information onto a continuous printing medium. The continuous printing medium comprises the first printing medium connected with the second printing medium. The first printing medium has the first transaction information area and a first value-added information area. The second printing medium has the second transaction information area and the second value-added information area. The first transaction information area, the first value-added information, the second transaction information area and the second value-added information area are aligned sequentially. The printing method comprises the steps of firstly printing the first transaction data and the value-added information respectively onto the first transaction information area and the second value-added information area, and secondly, moving the continuous printing medium. And the last step is to print the first the second transaction data onto the second transaction information area.

10 Claims, 5 Drawing Sheets

METHOD AND DEVICE FOR PRINTING VALUE-ADDED INFORMATION

This application claims the benefit of Taiwan application Serial No. 93124585, filed Aug. 16, 2004, the subject matter of which is incorporated herein by reference.

BACKGROUND OF THE INVENTION

1. Field of the Invention

The invention relates to a method and a device of printing, and more particularly to a method and a device for printing value-added information.

2. Description of the Related Art

Generally, the cash registers in the stores and the automatic teller machine (ATM) in the banks employ the dot printers or the thermo printing devices to print invoices, receipts and the detailed transaction tables.

The dot printers have an impact mechanism with needle pins that strike an inked ribbon, thereby transferring ink from the ribbon to the printing sheets resulting in the performance of printing. Therefore, the dot printers are slow in speed and noisy during printing operation. Furthermore, due to the heavily striking force on the ribbon made by the pin heads, the needle pins are easily damaged. As one of the needle pins is broken, printing will not continue unless the entire pin head is replaced. It is therefore economically inefficient. In addition, the dot printers produce inferior printing quality so dot matrix print devices are only used for printing medium that does not require high resolution.

Even though the thermo printers are relatively fast, the printed sheets are not easily preserved and the thermo-sheets are not environmentally friendly. Moreover, the printed sheets show the lack of plentiful variations in colors because the thermo printers can only produce monochrome printing products.

According to the aforesaid description, neither the conventional dot printers nor the conventional thermo printers can produce invoices, receipts or detailed transaction tables with superior quality and polychrome value-added information such as advertisements, slogans, or instant news. Currently, only large-scale businesses are able to have the color value-added information pre-printed on the invoices, receipts or detailed transaction tables produced by the printery, while small-sized businesses are unable to do it. However, stores or ATM would not be able to timely change the contents of the value-added information. It is therefore necessary to invent a method and a device for printing value-added information.

SUMMARY OF THE INVENTION

It is therefore an object of the invention to provide a method and a device for printing value-added information, which enable the stores and ATM to produce the invoices, receipts and detailed transaction tables with superior quality, and plentiful various colored value-added information printed on.

It is an object of the present invention to provide a method and a device for printing value-added information onto a continuous printing medium. The continuous printing medium includes a first printing medium and a second printing medium connected with the first printing medium. The first printing medium has a first transaction information area and a first value-added information area. The second printing medium has a second transaction information area and a second value-added information area. The first transaction information area, the first value-added information area, the second transaction information area and the second value-added information area are aligned sequentially. The printing method includes three steps: The first step is printing first transaction data and the value-added information onto the first transaction information area and the second value-added information area, respectively. The next step is moving the continuous printing medium. And the last step is printing a second transaction data onto the second transaction information area.

It is another objective of the present invention to provide a printing device for printing value-added information onto a continuous printing medium. The continuous printing medium includes a first printing medium and a second printing medium connected with the first printing medium. The first printing medium has a first transaction information area and a first value-added information area. The second printing medium has a second transaction information area and a second value information area. The first transaction information area, the first value-added information area, the second transaction information area and the second value-added information area are aligned sequentially. The printing device includes a control unit, an inkjet printing unit and a printing medium transporting unit. The control unit controls operation of the printing device, receiving first transaction input data, second transaction input data and value-added information input data, and converting the first transaction input data, the second transaction input data and the value-added information input data into first transaction print data, second transaction print data and value-added information print data. The inkjet printing unit is connected with the control unit. The inkjet printing unit prints the value-added information print data onto the second value-added information area, and the first transaction print data and the second transaction print data onto the first transaction information area and the second transaction information area, respectively. The printing medium transporting unit, controlled by the control unit, moves the continuous printing medium. The inkjet printing unit firstly prints the first transaction print data and the value-added information print data onto the first transaction information area and the second value-added information area, respectively. After the continuous printing medium is moved, the inkjet printing unit prints the second transaction print data onto the second transaction information area.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1:
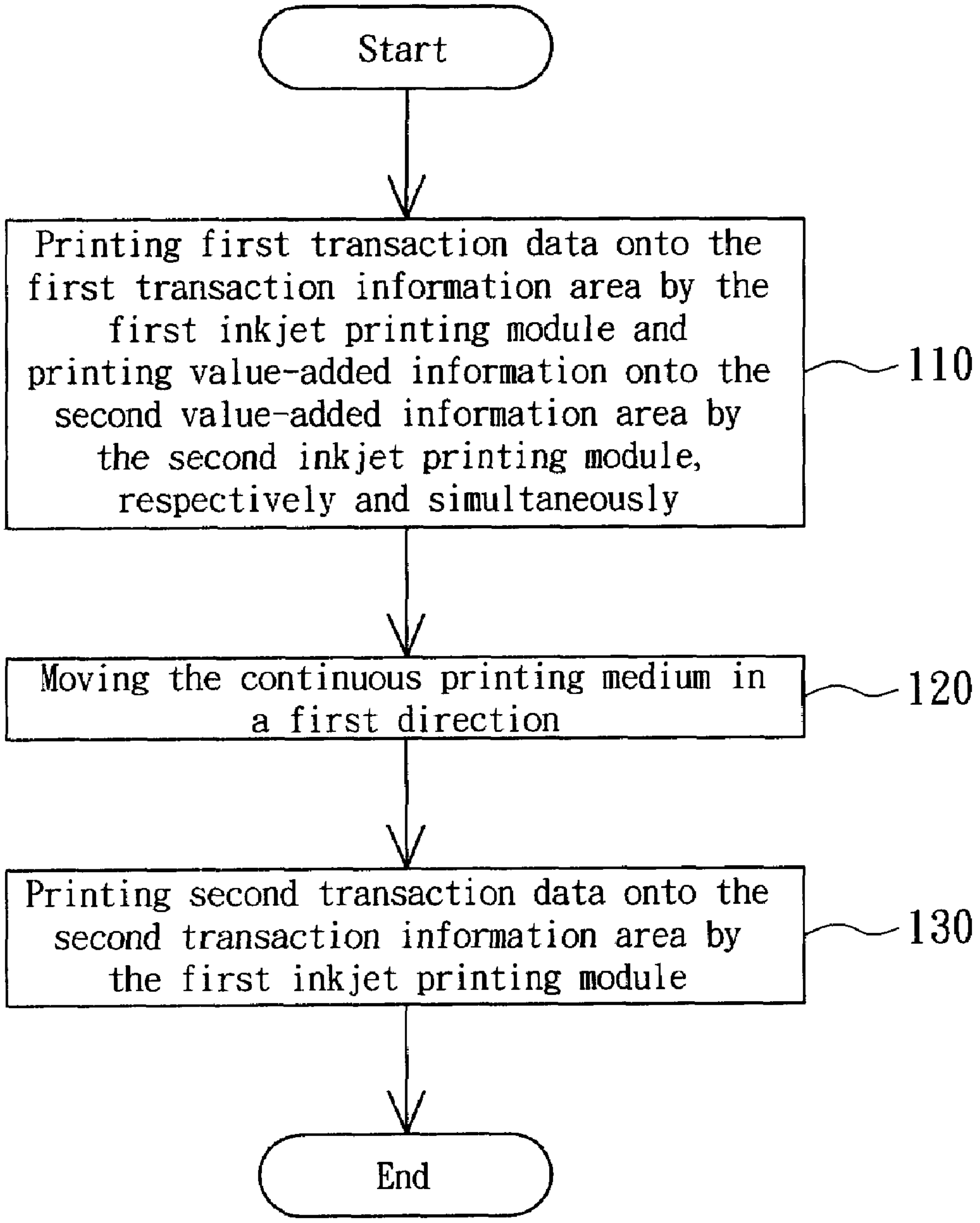
FIG. 1 is a flow chart illustrating a printing method according to a first embodiment of the present invention.
Figure 2A:
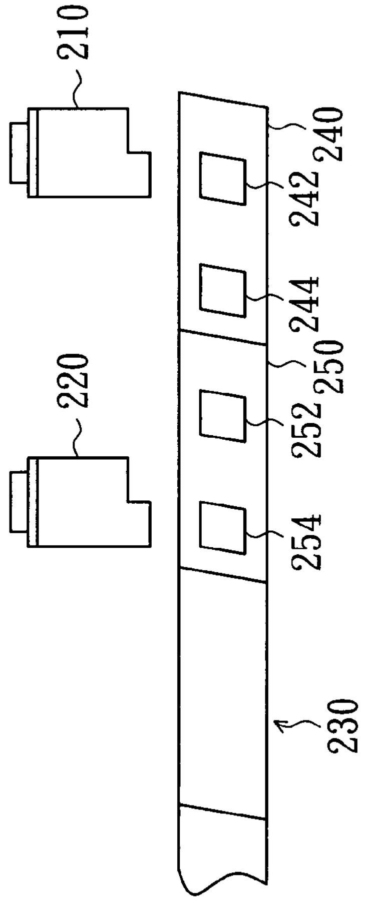
FIGS. 2A~2B are schematic diagrams illustrating the continuous actions of the continuous printing medium utilizing the printing method shown in the FIG. 1.
Figure 2B:
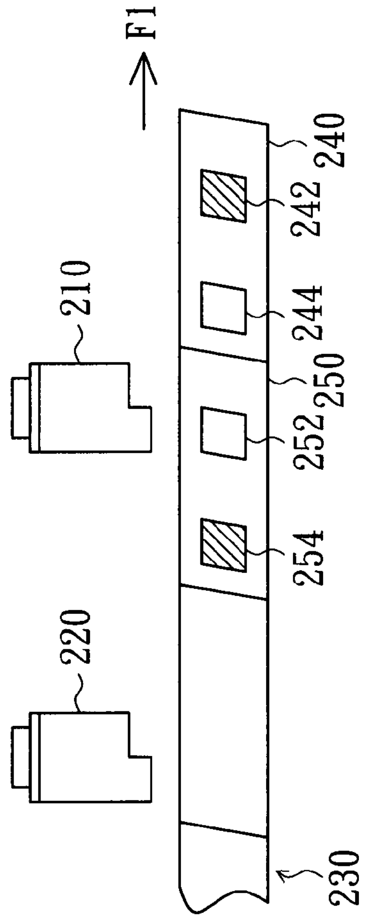

Referring to FIG. 1 and FIGS. 2A~2B, the FIG. 1 is a flow chart illustrating the printing method according to a first embodiment of the present invention. The FIGS. 2A~2B are schematic diagrams illustrating the continuous actions of the continuous printing medium utilizing the printing method shown in the FIG. 1.

As illustrated in FIGS. 2A and 2B, a first inkjet printing module 210 and a second inkjet printing module 220 in the first embodiment prints first transaction data, second transaction data and value-added information onto the continuous printing medium 230. The document forms of invoices, bills or detailed transaction tables are examples of the continuous printing medium 230. The continuous printing medium 230 includes a first printing medium 240 and a second printing medium 250 connected with the first printing medium 240. The first printing medium 240 has a first transaction information area 242 and a first value-added information area 244. The second printing medium 250 has a second transaction information area 252 and a second value-added information area 254. The first transaction information area 242, the first value-added information area 244, the second transaction information area 252 and the second value-added information area 254 are aligned sequentially.

As shown in the step 110 in FIG. 1, the printing method according to the first embodiment starts with the first inkjet printing module 210 and the second inkjet printing module 220 simultaneously printing the first transaction data and the value-added information onto the first transaction information area 242 and the second value-added information area 254, respectively, as shown in step 110. At this moment, the operation of the first inkjet printing module 210, the second inkjet printing module 220 and the continuous printing medium 230 is shown in FIG. 2A. Advertisements, instant news, jokes, slogans or articles are examples of the value-added information.

The next step is that the continuous printing medium 230 moves in the first direction F1, as shown in the step 120 in FIG. 1. At last, in the step 130, the first inkjet printing module 210 prints the second transaction data onto the second transaction information area 252. At this moment, the operation of the first inkjet printing module 210, the second inkjet printing module 220 and the continuous printing medium 230 is shown in the FIG. 2B.

In other words, the first printing medium 240 and the second printing medium 250 print invoices for the first customer and the second customer, respectively. As the first inkjet printing module 210 prints the first transaction data of the first customer onto the first transaction information area 242 of the first printing medium 240; in the meantime, the second inkjet printing module 220 prints the value-added information onto the second value-added information area 254 of the second printing medium 250. The value-added information printed by the second inkjet printing module 220 can be completed within the time spent by the first inkjet printing module 210 for printing the first transaction data and the time spent by the cashier for giving changes to the first customer.

Accordingly, when the second customer wants to pay a bill, the first inkjet printing module 210 prints the second transaction data of the second customer onto the second transaction information area 252 of the second printing medium 250 to complete the printing of the second printing medium 250. Therefore, according to the foregoing printing method, the value-added information can be printed onto the second printing medium 250 so that the second printing medium 250 has the function of added value and customer's purchase intention is hence increased.

Figure 3:
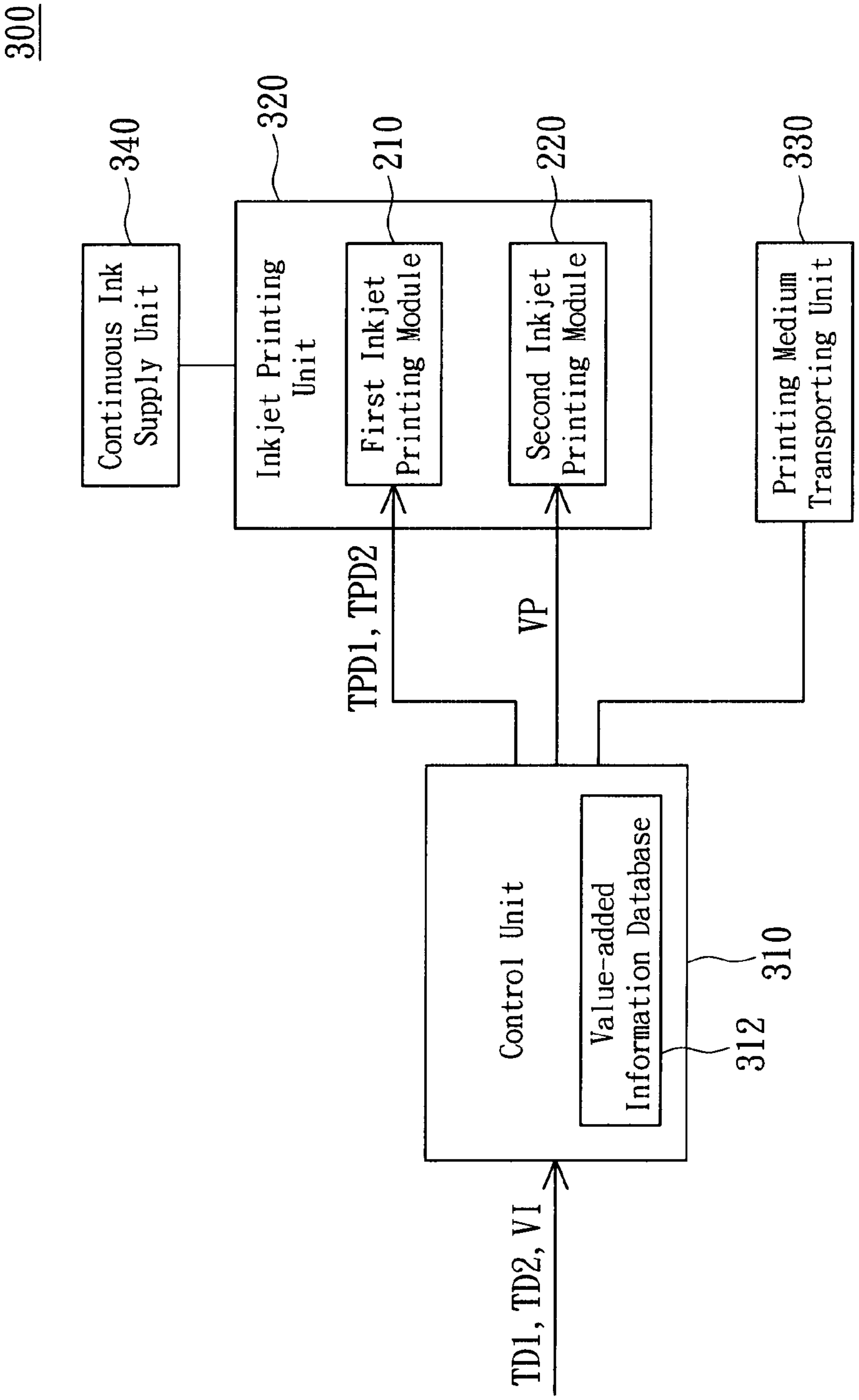
FIG. 3 shows a block diagram illustrating the printing device according to the first embodiment of the present invention.

Referring to FIGS. 2A~2B and FIG. 3, FIG. 3 shows a block diagram illustrating the printing device according to the first embodiment of the present invention. The point of the sale terminal is an example of the printing device 300. The printing device 300 includes a control unit 310, an inkjet printing unit 320, a printing medium transporting unit 330 and a continuous ink supply unit 340. The microprocessor is an example of the control unit 310.

The control unit 310 controls the printing device 300, receives first transaction input data TD1, second transaction input data TD2 and value-added information input data VI. For example, the value-added information input data VI includes a number of various colored images. After the control unit 310 receives the value-added information input data VI, the control unit 310 stores the value-added information input data VI in a value-added information database 312. When the stores are going to print the value-added information on the continuous printing medium 230, they can select the most appropriate value-added information from the value-added information database 312 through the control unit 310. Accordingly, the value-added information printed on the continuous printing medium 230 will have enhanced varieties. The control unit 310 then converts the first transaction input data TD1, the second transaction input data TD2 and the value-added information input data VI into first transaction print data TPD1, second transaction print data TPD2 and value-added information print data VP.

The printing medium transporting unit 330 controlled by the control unit 310 moves the continuous printing medium 230 in a first direction F1. The continuous ink supply unit 340 connected with the inkjet printing unit 320 continuously supplies ink to the inkjet printing medium 320. The inkjet printing unit 320 includes the first inkjet printing module 210 and the second inkjet printing module 220. The first inkjet printing module 210 and the second inkjet printing module 220 are connected with the control unit 310. The first inkjet printing module 210 and the second inkjet printing module 220 have a plurality of polychrome ink cartridges.

The first inkjet printing module 210 and the second inkjet printing module 220 simultaneously print the first transaction print data TPD1 and the value-added information print data VP onto the first transaction information area 242 and the second value-added information area 254. And then after the continuous printing medium 230 is moved in the first direction F1, the first inkjet printing module 210 prints the second transaction print data TPD2 onto the second transaction information area 252. The value-added information input data VI is selected from the value-added information database 312.

The inkjet printing module is employed in the first embodiment to print the goods transaction data. Therefore, compared with the conventional dot printers or the conventional thermo printers, the printing method according to this embodiment can produce superior quality and easily-preserved printing media such as the invoices, receipts or the detailed transaction tables. Moreover, the printing method according to this embodiment not only prints the transaction information of the customers, it can also print out value-added information, including invoices, receipts, and detailed transaction tables, with high color saturation quality and rich color levels. These performances were not available in the conventional dot printer or the thermo printer.

In addition, the printing method according to the first embodiment is that as the transaction data for the first customer is printed; in the meanwhile, the value-added information is printed onto the receipt for the second customer. Accordingly, as for single charge, the printing speed based on the first embodiment is faster than the conventional dot printers.

Second Embodiment

Figure 4:
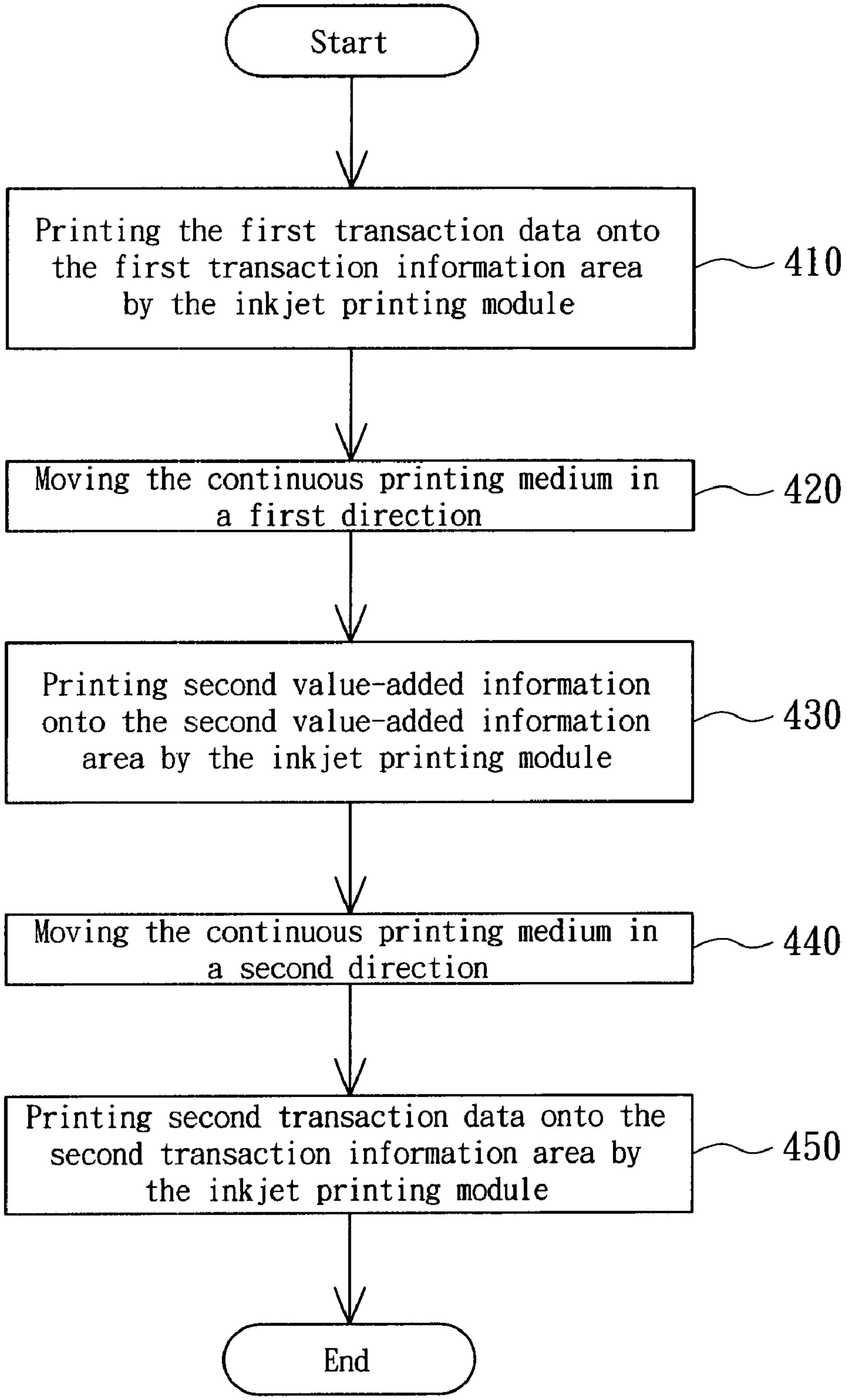
FIG. 4 is a flow chart illustrating the printing method according to a second embodiment of the present invention.
Figures 5A, 5B, 5C:
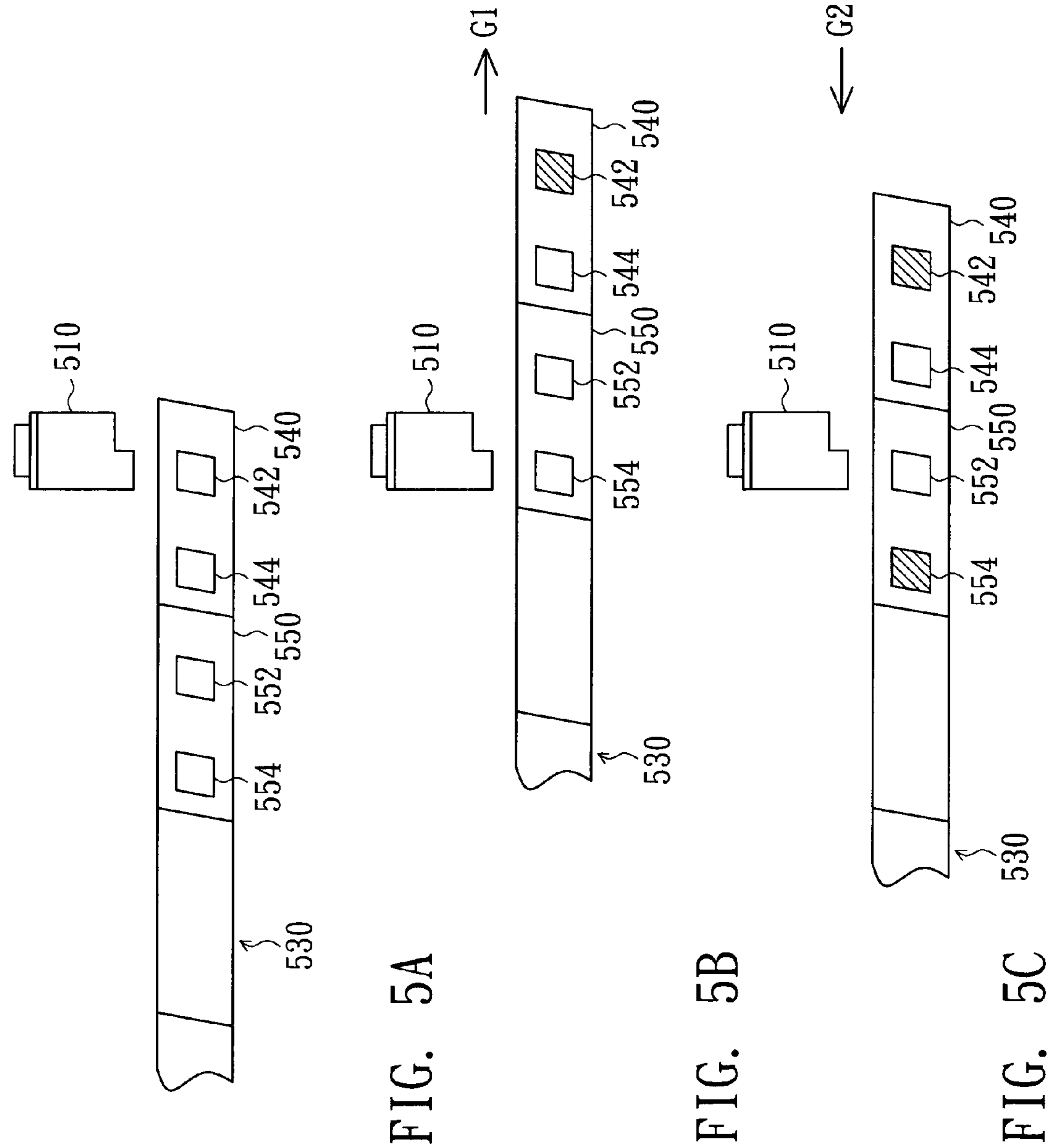
FIGS. 5A~5C are schematic diagrams illustrating the continuous actions of the continuous printing medium utilizing the printing method shown in the FIG. 4.

Refer to both FIG. 4 and FIGS. 5A~5C. FIG. 4 is a flow chart illustrating the printing method according to the second embodiment of the present invention. FIGS. 5A~5C are schematic diagrams illustrating the continuous actions of the continuous printing medium utilizing the printing method shown in the FIG. 4.

As shown in the FIGS. 5A~5C, only one inkjet printing module 510 is employed in the second embodiment to print first transaction data, second transaction data and value-added information onto the continuous printing medium 530. As shown in the step 410, the printing method according to the second embodiment starts with the inkjet printing module 510 printing the first transaction data onto the first transaction information area 542. At this moment, the operation of the inkjet printing module 510 and the continuous printing medium 410 is shown in the FIG. 5A.

And the following step is that the continuous printing medium 530 moves in a first direction G1, as shown in the step 420. Then the inkjet printing module 510 prints the value-added information onto the second value-added information area 554, as shown in the step 430. At this moment, the operation of the inkjet printing module 510 and the continuous printing medium 530 is shown in the FIG. 5B.

As shown in the step 440, the next step is that the continuous printing medium 530 moves in a second direction G2, which is substantially opposite to the first direction G1. The last step shown in the step 450 is that the inkjet printing module 510 prints the second transaction data onto the second transaction information area 552. At this moment, the operation of the inkjet printing module 510 and the continuous printing medium 530 is shown in the FIG. 5C.

In other words, if the first printing medium 540 and the second printing medium 550 are the receipts printed out for the first customer and the second customer, the inkjet printing module 510 prints the value-added information onto the second printing medium 550, after the inkjet printing module 510 prints out the receipt for the first customer, within the time frame between the transactions of the first customer and the second customer. Accordingly, when the second customer wants to pay a bill, the inkjet printing module 510 simply prints the second transaction data of the second customer onto the second transaction information area 552 of the second printing medium 550 to complete the printing of the second printing medium 550.

The printing device according to the second embodiment is similar with the diagram shown in the FIG. 3 and will not be repeated. Although only one inkjet printing module 510 is employed in the second embodiment to print data on the continuous printing medium 530, the printing method according to the second embodiment can print the value-added information onto the second printing medium 550. The printing device hence has the function of added value, so that customer's purchase intention is increased by comparison with the first embodiment.

Moreover, the printing method according to the second embodiment is to print the value-added information within the time frame between the transactions of the first customer and the second customer. Therefore, as for single charge, the printing speed of printing the continuous printing medium based on the second embodiment is faster than the conventional dot printers.

The method and the device of printing disclosed in the foregoing embodiment of the present invention enable the stores and ATM to produce the invoices, receipts and detailed transaction tables with superior quality, and plentiful various colored value-added information printed on.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A printing method, for printing value-added information onto a continuous printing medium, wherein the continuous printing medium includes a first printing medium and a second printing medium connected with the first printing medium, the first printing medium has a first transaction information area and a first value-added information area, and the second printing medium has a second transaction information area and a second value-added information area, and wherein the first transaction information area, the first value-added information area, the second transaction information area and the second value-added information area are aligned sequentially, the printing method comprising:

printing first transaction data onto the first transaction information area and the value-added information onto the second value-added information area;

moving the continuous printing medium in a first direction; and printing second transaction data onto the second transaction information area.

2. The printing method according to claim 1, wherein the first transaction data and the second transaction data are printed by a first inkjet printing module, and the value-added information is printed by a second inkjet printing module.

3. The printing method according to claim 2, wherein the first inkjet printing module and the second inkjet printing module print the first transaction data and the value-added information, respectively and simultaneously.

4. The printing method according to claim 1, wherein the step of printing the first transaction data and the value-added information comprises:

printing the first transaction data onto the first transaction information area;

moving the continuous printing medium in a second direction; and printing the value-added information onto the second value-added information area.

5. The printing method according to claim 4, wherein the second direction is substantially opposite to the first direction.

6. The printing method according to claim 5, wherein the first transaction data, the second transaction data and the value-added information are printed by an inkjet printing module.

7. The printing method according to claim 1, wherein the value-added information is a colored image.

8. The printing method according to claim 1, wherein the value-added information is selected from a value-added information database.

9. The printing method according to claim 1, wherein the value-added information is advertisements, instant news, jokes or slogans.

10. The printing method according to claim 1, wherein the continuous printing medium is a document form for an invoice, a receipt or a detailed transaction table.

* * * * *